United States Patent [19]

Kishi et al.

[11] Patent Number: 4,926,823
[45] Date of Patent: May 22, 1990

[54] METHOD OF CONTROLLING AN AIR/FUEL RATIO OR AN INTERNAL COMBUSTION ENGINE

[75] Inventors: Noriyuki Kishi; Atsushi Katoh, both of Tokyo; Tomohisa Saita, Saitama, all of Japan

[73] Assignee: Honda Giken Kogyo Kabushiki Kaisha, Tokyo, Japan

[21] Appl. No.: 119,657

[22] Filed: Nov. 12, 1987

[30] Foreign Application Priority Data

Nov. 12, 1986 [JP] Japan ................ 61-269335

[51] Int. Cl.$^5$ ............................ F02B 15/00
[52] U.S. Cl. .................... 123/432; 123/440; 123/90.16
[58] Field of Search ........... 123/432, 438, 440, 347, 123/348, 90.16

[56] References Cited

U.S. PATENT DOCUMENTS

| | | | |
|---|---|---|---|
| 4,056,931 | 11/1977 | Hata | 123/438 |
| 4,091,780 | 5/1978 | Masaki et al. | 123/438 |
| 4,106,448 | 8/1978 | Noguchi et al. | 123/440 |
| 4,480,617 | 11/1984 | Nakano et al. | 123/432 |
| 4,494,502 | 1/1985 | Endo et al. | 123/198 F |
| 4,494,503 | 1/1985 | Danno et al. | 123/348 |
| 4,494,504 | 1/1985 | Yagi et al. | 123/432 |
| 4,494,506 | 1/1985 | Hayama et al. | 123/198 F |
| 4,537,165 | 8/1985 | Honda | 123/432 |
| 4,587,936 | 5/1986 | Matasuura et al. | 123/432 |

Primary Examiner—E. Rollins Cross
Attorney, Agent, or Firm—Lyon & Lyon

[57] ABSTRACT

A method for controlling the air/fuel ratio of the intake air mixture supplied to an internal combustion engine having multiple cylinders and a valve operating mechanism for switching the magnitude of the intake valve openings for low and high speed operation. The method includes the step of providing a lean air/fuel ratio at low speeds and the step of gradually varying the air/fuel ratio of a range of engine speeds that include the speed at which the valve operation is switched to avoid any possible abrupt change in engine output upon switching the valve operation.

17 Claims, 2 Drawing Sheets

METHOD OF CONTROLLING AN AIR/FUEL RATIO OR AN INTERNAL COMBUSTION ENGINE

SUMMARY OF THE INVENTION

In view of the problems of the prior art and the inventors' discoveries, it is a major object of the present invention to provide a method of controlling an air/fuel ratio by varying the air/fuel ratio in relation to the operation of a valve switching device for achieving both increased engine output performance and fuel economy while avoiding sudden power output charges or shocks which might otherwise result from valve switching.

According to the present invention, the above object can be accomplished by providing a method of setting an air/fuel ratio for an internal combustion engine having a valve switching device for changing the characteristics of a valve operation as a function of at least engine rotational speed, comprising the step of gradually varying the air/fuel ratio according to at least a change in said engine rotational speed when said valve switching device effects a valve switching operation. When the air/fuel ratio is changed from a lean mixture to a rich mixture or from a rich mixture to a lean mixture, the engine output normally is increased or reduced. An abrupt change or shock can be avoided by gradually changing the air/fuel ratio.

DESCRIPTION OF THE PREFERRED EMBODIMENT

Figure 1:
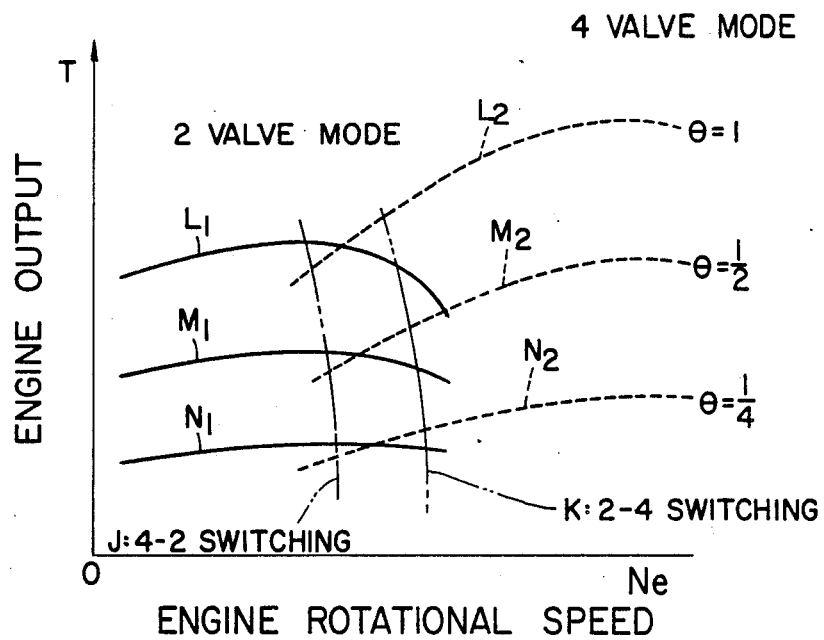
FIG. 1 is a graphic plot of engine output vs. engine speed for full throttle, half throttle and quarter throttle positions.
Figure 2:
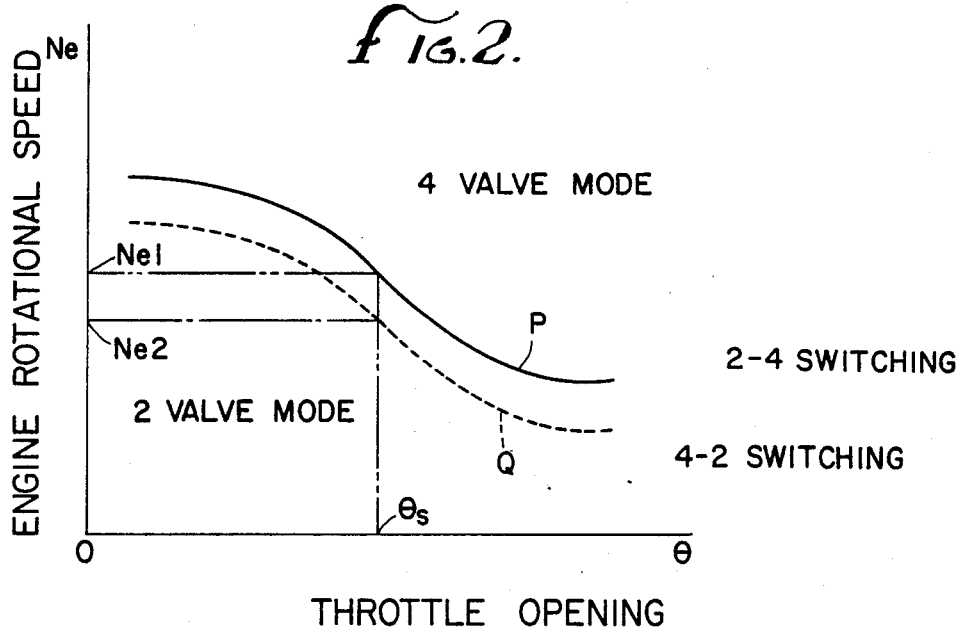
FIG. 2 is a graphic plot of engine rotational speed vs. throttle opening for both two-valve to four-valve switching and for four-valve to two-valve switching.
Figure 3:
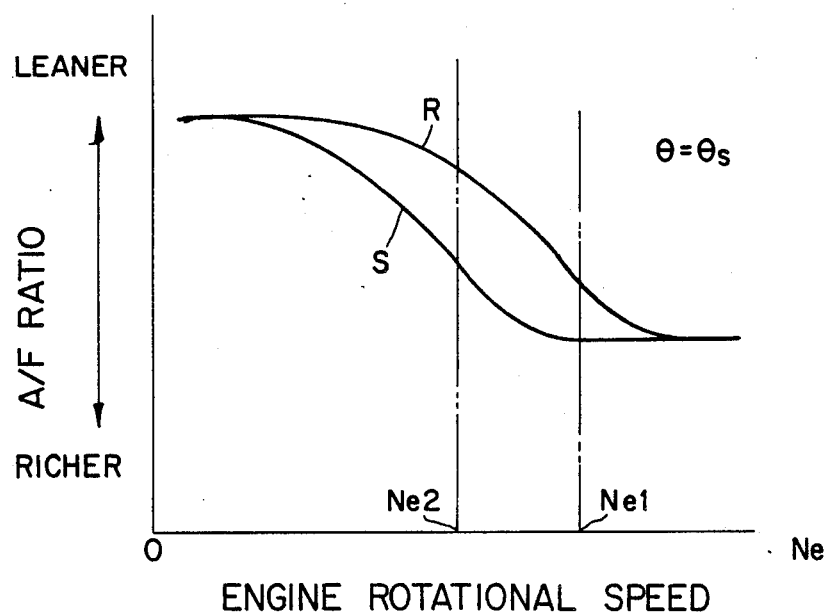
FIG. 3 is a graphic plot of air/fuel ratio vs. engine rotational speed for increasing and decreasing engine rotational speeds.

A preferred embodiment of the present invention will hereinafter be described in detail with reference to the accompanying drawings, wherein FIGS. 1, 2 and 3 are graphs showing the performance characteristics of an internal combustion engine employing the present invention. Specifically, the invention will be described in connection with a multi-cylinder engine having two intake valves and two exhaust valves per cylinder with a valve operating mechanism with a switching device capable of selectively operating either all four valves of each cylinder (4-valve mode) or only one intake and one exhaust valve (2-valve mode) of each cylinder. However, it is to be understood that the invention is also applicable to engines having other combinations of multiple valves and opening and closing mechanisms.

FIGS. 1 and 2 are graphs showing the manner in which the engine output varies and also showing the conditions for effecting switching between 4-valve and 2-valve modes. In the 4-valve mode, the two intake valves and the two exhaust valves are opened and closed as a function of the throttle valve opening $\theta$ and the engine rotational speed Ne. In the 2-valve mode, only one of the intake valves and only one of the exhaust valves are opened and closed as a function of the throttle valve opening $\theta$ and the engine rotational speed Ne.

In FIG. 1, the engine output is plotted as a function of engine speed for each of three throttle valve positions, namely, the curves L1, L2 when $\theta = 1$, i.e., when the throttle valve is fully open, curves M1, M2 when $\theta = \frac{1}{2}$, i.e., when the throttle valve is half open, and curves N1, N2 when $\theta = \frac{1}{4}$, i.e., when the throttle valve is open to $\frac{1}{4}$ of the full opening. The curves L1, M1 and N1 represent the 2-valve mode and curves L2, M2 and N2 represent the 4-valve mode. It is to be noted that for each throttle valve opening in the 2-valve and 4-valve modes of operation, the respective curves intersect at certain engine speeds. Therefore, the engine output is not varied abruptly, i.e., no shock is produced by effecting switching between the 2-valve and 4-valve modes at precisely the engine speeds where the curves intersect because the engine output is identical for that engine speed. However, as a practical matter, as indicated by the imaginary lines J and K, it is preferable to carry out switching between the 2-valve and 4-valve modes at points on opposite sides of the intersection of the output curves in the 2-valve and 4-valve modes, so that a certain degree of hysteresis will be given to the switching operation for stable control.

The graph of FIG. 2 illustrates boundary lines of conditions for selecting the 2-valve and 4-valve modes in a coordinate plane having a horizontal axis representing the throttle opening $\theta$ and a vertical axis representing the engine rotational speed Ne. The solid-line curve P shows a boundary line across which switching is effected from the 2-valve mode to the 4-valve mode, and the broken-line curve Q shows a boundary line across which switching is carried out from the 4-valve mode to the 2-valve mode. These curves P and Q are substantially equally spaced in the vertical direction (i.e., engine speed) from each other along their entire lengths. Such hysteresis in the switching between the 2-valve and 4-valve modes is preferable from the standpoint of stable control, as described above, for avoiding hunting of the engine during the transition between valve operating modes.

These graphs of FIGS. 1 and 2 show that the 4-valve mode is generally selected in a high engine rotational speed range, and the boundary lines P and Q are dependent on the throttle opening in FIG. 2. The engine intake vacuum may be employed instead of the throttle opening as a parameter for determining conditions for valve switching.

FIG. 3 shows the manner in which the air/fuel ratio varies dependent on valve switching at the throttle opening $\theta$s, for example, in FIG. 2. More specifically, in a low engine rotational speed range, the 2-valve mode is selected, and the air/fuel ratio can be set to an extremely lean value. When the engine rotational speed is increased in excess of Ne1, the 4-valve mode is selected. As indicated by the curve R in FIG. 3, illustrating increasing engine speed, the air/fuel ratio is gradually made richer starting from a time when the engine rotational speed is much lower than Ne1 and is continually increased in richness. When the engine rotational speed slightly exceeds Ne1 (i.e., switching to 4-valve mode), the air/fuel ratio is set to a comparatively rich value which may be the stoichiometric air/fuel ratio of 14.7.

When the engine rotational speed is lowered from a range in which the 4-valve mode is selected and the engine rotational speed reaches Ne2, switching from the 4-valve mode to the 2-valve mode is effected as shown in FIG. 2. During the decrease in engine speed, the air/fuel ratio is gradually made leaner starting from a time when the engine rotational speed is slightly higher than Ne2 as represented by the curve S in FIG. 3. The air/fuel ratio reaches the leanest value, as described above, only when the engine rotational speed becomes much lower than Ne2 (i.e., switching to 2-valve mode).

In actual applications, valve switching timing or setting of an air/fuel ratio valve can be achieved by a map look-up system in a central processing unit (not shown) or a closed loop system, whichever system is more advantageous according to various conditions.

With the present invention, an engine can be operated at an extremely lean air/fuel ratio in a 2-valve mode, and hence fuel economy can be improved without sacrificing the output performance of the engine. By gradually varying the air/fuel mixture in the range of the switching between 2-valve and 4-valve modes between such lean mixture and the normally preferred mixture, the transition between modes can be accomplished smoothly.

We claim:

1. A method of controlling an air/fuel ratio for an internal combustion engine having a valve switching device for changing the characteristics of an intake valve operation as a function of at least an engine rotational speed, comprising the step of:

gradually varying the air/fuel ratio according to at least a change in said engine rotational speed in a range of rotational speeds including when said valve switching device effects valve switching operation, wherein said valve switching device operates to open only one valve at low engine speeds and to open all intake valves at high engine speeds.

2. A method according to claim 1, including the steps of opening and closing the intake valves in a manner for maximizing the flow of intake air in a high engine rotational speed range and for relatively restricting the flow of intake air in a low engine rotational speed range.

3. A method according to claim 2, including the step of controlling the air/fuel ratio to be relatively lean in said low engine rotational speed range and relatively rich in said high engine rotational speed range.

4. A method according to claim 3, including the step of causing the operation of the valve switching device to occur at a higher rotational speed during engine speed increasing operation than during engine speed decreasing operation.

5. A method according to claim 4, including the step of starting said gradual varying the air/fuel ratio before reaching the rotational speed at which the valve switching occurs.

6. A method according to claim 5, including the step of continuing said gradual varying the air/fuel ratio beyond the rotational speed at which the valve switching occurs.

7. A method according to claim 6, including the step of continuing said gradual varying the air/fuel ratio over a substantial range of rotational speed below the rotational speed at which the valves switching occurs during engine speed decreasing operation.

8. A method according to claim 1, including the step of controlling the air/fuel ratio to be relatively lean in a low engine rotational speed range and relatively rich in a high engine rotational speed range.

9. A method according to claims 1 or 8, including the step of causing the operation of the valve switching device to occur at a higher rotational speed during engine speed increasing operation than during engine speed decreasing operation.

10. A method according to claim 9, wherein the difference in rotational speed between valve switching device operation during engine speed increasing and decreasing operation is relatively constant over all ranges of opening of a throttle valve for the engine.

11. A method according to claims 1 or 8, including the step of starting said gradual varying the air/fuel ratio before reaching the rotational speed at which the valve switching occurs.

12. A method according to claim 11, including the step of continuing said gradual varying the air/fuel ratio beyond the rotational speed at which the valve switching occurs.

13. A method according to claims 1 or 8, including the step of continuing said gradual varying the air/fuel ratio beyond the rotational speed at which the valve switching occurs.

14. A method of controlling an air/fuel ratio for an internal combustion engine with more than one intake valve per cylinder, comprising the steps of keeping all valves in a cylinder except one valve inoperatively closed throughout the duration of each cycle at low engine speeds wherein an offset position of said one valve creates a swirl, thus enabling normal combustion at said very lean air/fuel ratio which is leaner than a stoichiometric air/fuel ratio normally considered to be an ideal ratio;

opening all valves in said cylinder and gradually providing a richer air/fuel ratio when engine speed increases to greater than a predetermined high speed; and closing said all valves except one valve throughout the duration of each cycle and gradually providing a leaner air/fuel ratio when engine speed decreases to lower than a predetermined low speed.

15. The method of claim 14 wherein said predetermined high speed and said predetermined low speed are determined in conjunction with a throttle opening such that said predetermined high speed and said predetermined low speed are determined to be lower when said throttle opening is wider and determined to be higher when said throttle opening is narrower.

16. The method of claim 14 wherein
   said predetermined high speed and said predetermined low speed are determined in conjunction with an engine intake vacuum.

17. The method of claim 14 wherein said predetermined high speed is higher than said predetermined low speed, whereby temporary hysteresis is employed for stable control.

* * * * *